United States Patent [19]

Tadauchi et al.

[11] Patent Number: 4,654,677
[45] Date of Patent: Mar. 31, 1987

[54] RECORDING APPARATUS

[75] Inventors: Masaharu Tadauchi; Tatsuki Inuzuka; Hideo Hirane; Kunio Sato, all of Hitachi, Japan

[73] Assignee: Hitachi, Ltd., Tokyo, Japan

[21] Appl. No.: 482,190

[22] Filed: Apr. 5, 1983

[30] Foreign Application Priority Data

Apr. 7, 1982 [JP] Japan ................................. 57-56566

[51] Int. Cl.⁴ .......................................... G01D 15/06
[52] U.S. Cl. ............................ 346/153.1; 346/76 PH
[58] Field of Search ........... 346/76 PH, 139 C, 153.1; 219/216, 216 PH; 355/14 E, 14 CH, 14 TR, 3 CH; 427/145; 430/348, 349, 350

[56] References Cited

U.S. PATENT DOCUMENTS

| 2,035,475 | 3/1936 | Hay | 219/216 |
| 3,377,599 | 4/1968 | Reis | 346/76 PH X |
| 3,912,844 | 10/1975 | Endo et al. | 430/348 |
| 4,057,016 | 11/1977 | Endo et al. | 430/349 |
| 4,314,257 | 2/1982 | Tokunaga et al. | 346/76 PH X |

OTHER PUBLICATIONS

A. E. Schierhorst, Thermal Printing Media, IBM Technical Disclosure Bulletin, vol. 26, No. 6, Nov. 1983.

Primary Examiner—Ulysses Weldon
Attorney, Agent, or Firm—Antonelli, Terry & Wands

[57] ABSTRACT

A recording apparatus comprising an input terminal to which a picture information signal to be recorded is applied, a driver for moving an electrostatic printing medium in a predetermined direction, an apparatus for electrifying the electrostatic printing medium, a thermal printing head for heating the electrostatic printing medium in accordance with the picture information signal to reduce the resistance of the heated regions of the electrostatic printing medium, thereby forming a pattern of resistance-reduced region on the electrostatic printing medium, so that a charge pattern (electrostatic latent image) according to the picture information signal is formed on the surface of the electrostatic printing medium.

8 Claims, 7 Drawing Figures

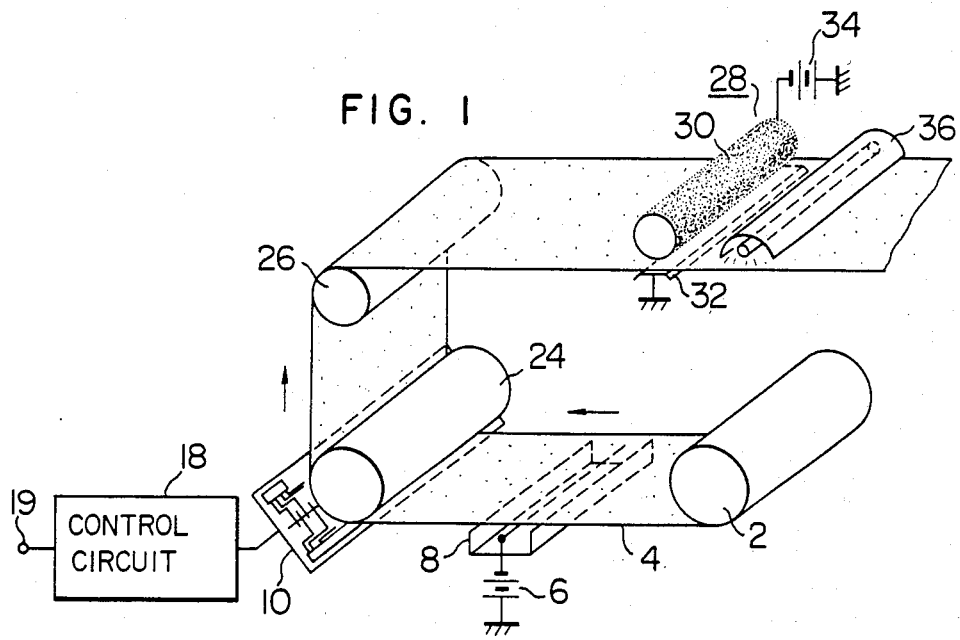
FIG. 1
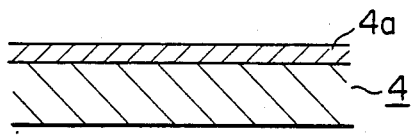
FIG. 2
FIG. 3
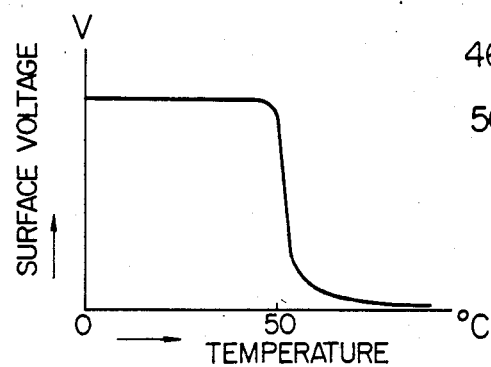
FIG. 7
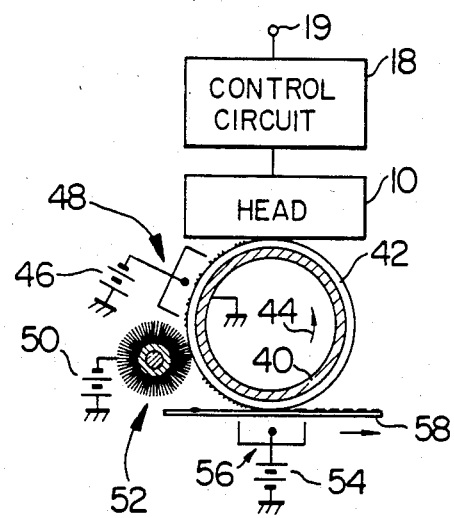

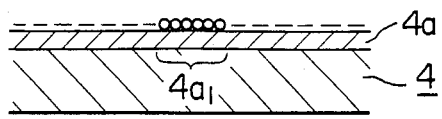
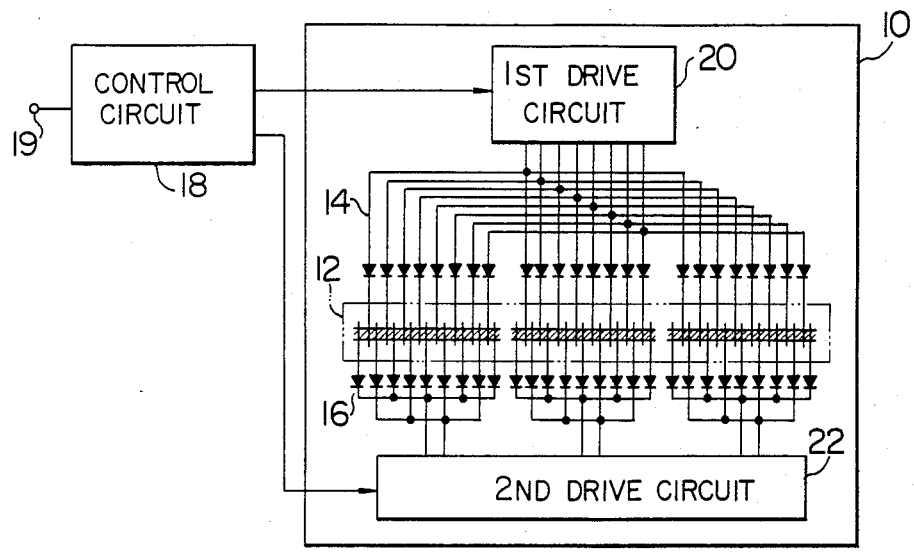
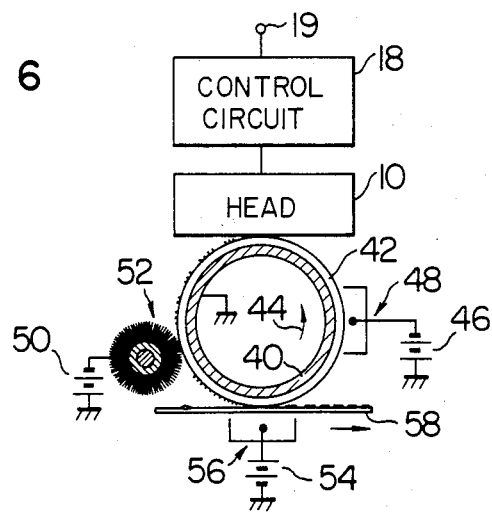

RECORDING APPARATUS

BACKGROUND OF THE INVENTION

This invention relates to recording apparatus, and particularly to a recording apparatus suitable for use in recording as a visible image such an electric picture information signal as is presented on facsimile, computer terminal or the like.

The recording apparatus in facsimile and the printer of computer terminal, which record an electrical picture information signal as a visible image, employ the thermal printing method, or electrostatic printing method.

In the thermal printing method, thermal printing paper which colors when heated is used and the thermal printing head is made in contact therewith to record an information picture thereon by driving the head in accordance with an electric picture information signal. This method provides a relatively simple recording mechanism, but the printing paper to be used in this method is set to a coloring temperature as high as 60° to 70° C. in order to prevent coloring at the normal temperature. Therefore, the thermal printing head, once driven, will not easily be reduced to a low temperature due to its thermal inertia and thus it is difficult to record at high speed. Also, since the reaction coloring agent of printing paper secularly changes, it is difficult to keep the recorded picture image in good condition for a long time.

The electrostatic printing method includes the multi-stylus recording method in which electrostatic printing paper is used, and a multistylus printing head is driven by an electric picture information signal to record on the electrostatic printing paper an electrostatic latent image which is then developed with toner, and a laser beam recording method using electronic photograph technique. In the multistylus recording method, the printing head is driven in accordance with an electric picture information signal to record an electrostatic latent image on the electrostatic printing paper by the corona discharge from the multistylus. Therefore, the drive circuit for the printing head needs a switching element of high breakdown voltage and the discharge characteristic of multistylus is affected by the moisture of the atmosphere to change the darkness of recorded image. On the other hand, in the laser beam recording method, a medium of a photoconductive, photosensitive material is used, and the laser beam modulated in its intensity by an electric picture information signal is emitted onto the surface of the medium to record an electrostatic latent image on the surface of the medium. This method, however, requires a complex control for deflecting the laser beam to scan.

SUMMARY OF THE INVENTION

It is an object of the invention to provide a novel recording apparatus capable of removing the drawbacks in the conventional heat-sensitive recording and electrostatic recording method and which has a simple mechanism and can record picture images with stability and at high speed.

In order to achieve this object, the inventors of this application considered that the electric resistance of the electrostatic recording medium decreases as the temperature increases. That is, the thermal printing head is driven by a picture information signal to be recorded to form a heating pattern corresponding to the information signal, which heats the electrostatic recording medium to form a pattern of resistance reduced regions on the medium so that a charge pattern (electrostatic latent image) according to the picture information signal is formed thereon and developed to be a visible image.

BRIEF DESCRIPTION OF THE DRAWINGS

FIG. 1 is a schematic diagram of one embodiment of the recording apparatus of the invention.

FIG. 2 is a cross-sectional diagram of an electrostatic recording paper.

FIG. 3 shows a characteristic curve for the electrostatic recording paper.

FIG. 4 is a cross-sectional diagram of the electrostatic recording paper, showing the developed condition.

FIG. 5 is a connection diagram of a thermal printing head and a drive circuit therefor.

FIG. 6 is a schematic diagram of a second embodiment of the recording apparatus of this invention.

FIG. 7 is a schematic diagram of a modification of the embodiment of FIG. 6.

DESCRIPTION OF THE PREFERRED EMBODIMENTS

Some embodiments of this invention will hereinafter be described with reference to the accompanying drawings.

FIG. 1 is a schematical diagram of a first embodiment of a recording apparatus according to this invention. This recording apparatus employs an electrostatic printing paper as a recording medium, and forms an electrostatic latent image directly on the electrostatic printing paper, which is then developed.

Referring to FIG. 1, there is shown an electrostatic printing paper 4, which is fed from a supply roll 2. This printing paper may be a conventional electrostatic printing paper, and as shown in FIG. 2, has a dielectric layer $4a$ formed on its recording surface side. The printing paper 4 is driven by a platen roll 26 and a guide roll 24 in the arrow direction and is uniformly electrified to have minus charges on its dielectric layer surface $4a$ by a corona charger 8 negatively biased by a DC power supply 6. Then, the printing paper 4 is heated in a heat pattern according to a picture information signal by a thermal printing head 10 which is driven by the picture information signal to be recorded.

When the dielectric layer $4a$ of the paper 4 is heated by the head 10, the heated region of the dielectric layer has its resistance decreased and thus discharges to become at a low potential with the result that an electrostatic latent image is formed on the surface of the dielectric layer $4a$. FIG. 3 shows a temperature vs. surface potential characteristic curve of the dielectric layer $4a$ of the electrostatic printing paper 4.

From FIG. 3, it will be seen that the surface potential of the dielectric layer $4a$ of the paper 4 is constant, or about 100–200 V at less than about 50° C., but suddenly reduces to about 0–10 V at above 50° C. as a result of abrupt reduction in its electric resistance and hence discharging.

The printing paper having an electrostatic latent image formed on its surface is fed to a developing device 28 formed of an electromagnetic brush developing roll 30, a back electrode 32 and a DC biasing power supply 34. At this developing device 28, when the developing roll 30 is negatively biased by the power supply 34, toner is deposited on the discharged region $4_{a1}$ of the dielectric layer 4a from the developing roll 30 as shown in FIG. 4 so that the paper 4 is developed negatively. Subsequently, the printing paper 4 is fed to a fixing device of lamp heater type, 36, by which the toner deposited on the dielectric layer 4a is fused to stick thereto.

The platen roll 26, guide roll 24, corona charger 8, developing device 28 and fixing device 36 may be those used in the conventional electrostatic recording apparatus.

The thermal printing head 10, as shown in FIG. 5, comprises groups of heating resistor elements 12, first and second lead electrode groups 14 and 16 connected to the groups of heating resistor elements 12, and first and second drive circuits 20 and 22 for driving the first and second lead electrode groups 14 and 16, respectively. A control circuit 18 is responsive to a picture information signal applied to a signal input terminal 19 to selectively supply current to the groups of heating resistor elements, thereby heating them.

The thermal printing head 10 and the drive circuit 18 therefor are, for example, shown in FIG. 12 in U.S. Pat. No. 3,984,844, and may be conventional ones. The conventional thermal printing head, however, is used with a thermal printing paper, and thus must heat the groups of heating resistor elements up to a temperature of 60° to 70° C. The thermal printing head in this application is used with electrostatic printing paper, and thus heats the groups of heating resistor elements up to about 50° C. at which the electric resistance of the paper dielectric layer can be suddenly reduced. This enables a pulse signal to be applied to the thermal printing head thereby easily controlling its heating temperature.

According to this recording apparatus, the dielectric layer 4a of the electrostatic printing paper 4 is electrified and, discharged by the heating of the thermal printing head 10, with relatively good stability in varying environment. In addition, the thermal printing head can heat and discharge the dielectric layer with small power, and thus can record at high speed. Specifically, the dielectric layer 4a is electrified by corona charger 8 enough to be saturated with charge and hence relatively stably done under change of environmental conditions. In addition, the surface potential of the dielectric layer 4a after electrifying is not greatly reduced under natural conditions. Moreover, since the electric resistance of the dielectric layer 4a can be suddenly reduced to make it discharge by heating to about 50° C. depending on material to be used, the power to be supplied to the groups of heating resistor elements 12 of the thermal printing head 10 may be small. Also, the power to the groups of heating resistor elements 12 can be controlled by, for example, the width of a current pulse in order to compensate for the temperature change of environment and thus the heating can be stably controlled, so that stable recording of information of picture can be realized.

Furthermore, as compared with the thermal printing method using thermal printing paper, the thermal printing head may be heated to low temperature to record information and therefore the thermal inertia of the head may be small. This enables a latent image to be formed at higher speed than in the thermal printing method, that is, information of a picture can be recorded at high speed.

Thus, according to this invention, since in the electrostatic printing method, the electric resistance of the dielectric layer of the electrostatic printing paper is reduced with increase of temperature, the thermal printing head is driven by a picture information signal to be recorded, so as to form a heating pattern corresponding to the information signal, and thereby heating the electrostatic printing paper to form a pattern of low resistance region, and hence a charge pattern (electrostatic latent image) corresponding to the picture information signal on the surface of the electrostatic printing paper, thereafter this electrostatic latent image being developed to produce a visible image.

In other words, this invention combines both advantages in the thermal printing method and the electrostatic printing method, or the simple recording mechanism and capability of recording any picture information at high speed and with stability; that is, this invention employs the electrostatic printing method using the thermal printing head in order to remove the disadvantages of both methods.

In the above embodiment, the dielectric layer 4a of the electrostatic printing paper 4 is uniformly electrified and then heated by the thermal printing head. Since the dielectric layer 4a, when heated, is once reduced in its resistance and kept at the low-resistance condition for a certain time, the charger 8 may be placed after the thermal printing head 10 i.e., between the rolls 24 and 26 so that after the dielectric layer 4a is heated by the thermal printing head, the nonheated region is electrified by the charger 8. This enables the formation of the same electrostatic latent image and hence the same recorded picture as in the first embodiment of FIG. 1.

While toner is deposited on the charged region of the dielectric layer 4a to negatively develop in the first embodiment, toner may be deposited on the nondischarged region to positively develop. This positive development can be performed by reversing the polarity of the biasing power supply 34 of the developing device 28 shown in FIG. 1 and adjusting the output voltage to a proper value.

Moreover, while an electrostatic latent image is directly formed on the electrostatic printing paper 4 in the first embodiment, it is possible that a dielectric layer is provided on the surface of the rotary drum so as to have an electrostatic latent image formed on its surface as in the first embodiment, and the latent image is developed to be a visible image which is transferred to a printing paper from the dielectric layer.

FIG. 6 is a schematic diagram of a second embodiment of this invention. In FIG. 6, a dielectric layer 42 is provided on a conductive drum 40 formed of grounded metal or the like, which rotates in the arrow direction represented by numeral 44. The dielectric layer 42 is first electrified to have minus charges by a corona charger 48 negatively biased by a DC power supply 46, and then heated by the thermal printing head 10 of the same structure as that of the head 10 in FIG. 1 in accordance with a picture information signal applied thereto from the input terminal 19 via the control circuit 18, so that the heated region of the dielectric layer is discharged to form an electrostatic latent image. The dielectric layer on the drum is made of the same material as that in the first embodiment and its resistance is suddenly reduced at about 50° C. Subsequently, the discharged region is deposited thereon with toner by a developing brush roller 52 which is negatively biased by a DC power supply 50, thus it being negatively developed. The developed toner image is transferred to a transfer paper 58 by corona discharge from an electrifying device 56 which is placed under the drum 40 and positively biased by a DC power supply 54. The corona charger 48, developing brush roller 52 and electrifying device 56 may be ones used in the conventional electrostatic recording apparatus.

Also in this embodiment, after the dielectric layer is heated by the heating record head 10, the nonheated region may be electrified by the charger 48 to form an electrostatic latent image as illustrated in FIG. 7.

Moreover, it is possible that the developing brush roller 52 is biased positively by the biasing power supply 50 of which polarity is reversed and of which output voltage is adjusted to a proper value, in order to cause the noncharged region of the dielectric layer 42 to be deposited with toner to thereby be positively developed.

Thus, according to this invention, a picture information signal to be recorded is converted to a heating pattern by a thermal printing head, which thus heats an electrostatic printing medium so as to form a resistance-reduced region on its surface and therefore an electrostatic latent image according to the picture information signal, which is then developed to be a visible image. Therefore, the recording apparatus can be simply constructed to form an electrostatic latent image according to a picture information signal, and can exhibit stable recording characteristics. Moreover, since the electric resistance of the electrostatic recording medium can be reduced at a relatively low temperature, the thermal printing head may be supplied with small power and thus can record at high speed.

What is claimed is:

1. A recording apparatus comprising:
  an input terminal to which a picture information signal is applied;
  drive means for moving an electrostatic printing medium in a certain direction;
  means for electrifying said electrostatic printing medium;
  a thermal printing head having groups of heat generating resistor elements, and groups of lead electrodes connected to predetermined heat-generating regions of said groups of heat generating resistor elements, said heat-generating regions being selectively heated by supplying currents to heat the regions of said electrostatic printing medium opposing to said selectively heated regions of the resistor groups and thereby to reduce the resistance of the heated region of the medium;
  an electric drive circuit connected to said input terminal so as to apply potentials corresponding to said picture information signal, selectively to the groups of lead electrodes of said thermal printing head and thereby to supply current selectively to predetermined heat generating regions of said group of heat generating resistor elements, thus heating said regions so that an electrostatic latent image corresponding to said picture information signal can be formed on said electrostatic printing medium; and
  a developing device for developing the electrostatic latent image formed on said electrostatic printing medium to be visible image;
  wherein said thermal printing head heats predetermined regions of a dielectric layer of said electrostatic printing medium opposite to the selected heat generating regions of said groups of heat generating resistor elements supplied with current in accordance with said picture information signal, thereby to reduce the resistance of the heated regions of the dielectric layer of said electrostatic printing medium, and said electrifying means electrifies the dielectric layer of said electrostatic printing medium heated by said thermal printing head, thereby to charge regions of said dielectric layer except the low-resistance regions so as to form an electrostatic latent image according to said picture information signal.

2. A recording apparatus according to claim 1, wherein said electrostatic printing medium is an electrostatic printing paper on which a visible image is directly formed by said developing device.

3. A recording apparatus according to claim 1, further comprising a transfer device and wherein said electrostatic printing medium is a conductive drum having a dielectric layer on which a visible image is formed by said developing device and said transfer device transfers the visible image on said conductive drum to a transfer paper.

4. A recording apparatus according to claim 1, wherein said heated regions of the groups of heat generating resistor elements of the thermal printing head are heated to a temperature at which the resistance of said electrostatic printing paper is suddenly reduced.

5. A recording apparatus according to claim 1, wherein said electrifying means is a corona charging means.

6. A recording apparatus according to claim 2, wherein said electrifying means is a corona charging means.

7. A recording apparatus according to claim 3, wherein said electrifying means is a corona charging means.

8. A recording apparatus according to claim 4, wherein said electrifying means is a corona charging means.

* * * * *